United States Patent
Yamada (10) Patent No.: US 7,385,649 B2
(45) Date of Patent: Jun. 10, 2008

(54) VIDEO DISPLAY APPARATUS AND METHOD

(75) Inventor: Akihiro Yamada, Saitama (JP)

(73) Assignee: Sony Corporation (JP)

( * ) Notice: Subject to any disclaimer, the term of this patent is extended or adjusted under 35 U.S.C. 154(b) by 529 days.

(21) Appl. No.: 10/823,818

(22) Filed: Apr. 14, 2004

(65) Prior Publication Data

US 2005/0030427 A1    Feb. 10, 2005

(30) Foreign Application Priority Data

Apr. 14, 2003   (JP) ................ P2003-109043

(51) Int. Cl.
*H04N 5/91*   (2006.01)
*H04N 5/445*  (2006.01)
*H04N 9/00*   (2006.01)
*H04N 9/64*   (2006.01)
*H04N 11/00*  (2006.01)
*H04N 7/001*  (2006.01)

(52) U.S. Cl. ............... 348/559; 348/563; 348/567; 348/714; 348/715; 386/1; 386/46

(58) Field of Classification Search ............ 348/559, 348/563, 567, 714, 715; 386/1, 46
See application file for complete search history.

(56) References Cited

U.S. PATENT DOCUMENTS

| | | | | |
|---|---|---|---|---|
| 5,371,551 A * | 12/1994 | Logan et al. | ................ | 348/571 |
| 5,822,493 A | 10/1998 | Uchara et al. | | |
| 5,959,687 A * | 9/1999 | Dinwiddie et al. | ......... | 348/564 |
| RE36,801 E * | 8/2000 | Logan et al. | ................ | 348/571 |
| 6,154,600 A * | 11/2000 | Newman et al. | ................ | 386/4 |
| 6,172,712 B1 * | 1/2001 | Beard | ........................ | 348/552 |
| 6,233,389 B1 * | 5/2001 | Barton et al. | ................. | 386/46 |
| 6,259,441 B1 * | 7/2001 | Ahmad et al. | .............. | 715/720 |
| 6,295,099 B1 * | 9/2001 | Takahashi | .................... | 348/715 |
| 6,473,312 B1 * | 10/2002 | Hiratsuka et al. | ........... | 361/794 |
| 6,490,000 B1 * | 12/2002 | Schaefer et al. | ............ | 348/553 |
| 6,542,695 B1 * | 4/2003 | Akiba et al. | ................. | 386/125 |
| 6,762,797 B1 * | 7/2004 | Pelletier | ..................... | 348/559 |
| 6,766,100 B1 * | 7/2004 | Komar et al. | .................. | 386/46 |
| 6,775,463 B1 * | 8/2004 | Nooralahiyan et al. | ....... | 386/68 |
| 6,834,155 B1 * | 12/2004 | Taniguchi | .................... | 386/68 |
| 6,897,904 B2 * | 5/2005 | Potrebic et al. | ............. | 348/731 |
| 6,978,081 B1 * | 12/2005 | Schulz | ........................ | 386/46 |
| 2004/0160532 A1 * | 8/2004 | Sun | ............................. | 348/559 |

FOREIGN PATENT DOCUMENTS

| | | |
|---|---|---|
| JP | 06-284364 A | 10/1994 |
| JP | 07-336630 A | 12/1995 |
| JP | 08-237592 A1 | 9/1996 |
| JP | 2000-261750 A | 9/2000 |
| JP | 2001-169216 A | 6/2001 |

* cited by examiner

*Primary Examiner*—Brian P. Yenke
(74) *Attorney, Agent, or Firm*—Lerner, David, Littenberg, Krumholz & Mentlik, LLP (57) ABSTRACT

In a video display apparatus and method, video data of video being displayed on a display unit are sequentially updated and temporality stored in a storage unit. The video data stored in the storage unit is written into an external storage medium according to a first external operation, and is read from the external storage medium according to a second external operation. Video based on the video data read from the external storage medium is displayed on the display unit.

17 Claims, 6 Drawing Sheets

VIDEO DISPLAY APPARATUS AND METHOD

CROSS-REFERENCE TO RELATED APPLICATIONS

The present application claims priority from Japanese Application No. 2003-109043 filed Apr. 14, 2003, the disclosure of which is hereby incorporated by reference herein.

BACKGROUND OF THE INVENTION

This invention relates to a video display apparatus and method, and more particularly, is suitably applied to a television receiver.

Television receivers have been proposed which sequentially store video data of channels that users are watching in built-in memories after compressing and encoding the video data, and read, decode and display the video data from the built-in memories on monitors in accordance with users' playback commands (for example, refer to Japanese Patent Application Laid Open No. 8-237592).

With such television receivers, the users are able to watch past scenes that the users may have missed or the like. In this description, the display of past scenes is called a replay display.

Such television receivers, however, execute the replay display only for about a dozen seconds based on the video data stored in the built-in memories. This causes the problem that users cannot create archives containing scenes that they like by storing the video data and cannot remove the data from the television receivers.

As another problem, users cannot search the stored video to find user-desired scenes.

If television receivers with such a replay display function can allow users to create archives containing user-desired scenes, to remove the archives from the television receiver, and to search video replayed for user-desired scenes, the television receivers can have significantly improved functionality.

SUMMARY OF THE INVENTION

In view of the foregoing, an object of the present invention is to provide a video display apparatus and method capable of offering significantly improved functionality.

The foregoing object and other objects of the invention have been achieved by the provision of a video display apparatus including a display unit operable to display video; a storage unit operable to sequentially update and temporarily store video data of the video being displayed on the display unit; a read/write unit operable to write the video data stored in the storage unit into an external storage medium according to a first external operation, and to read the video data from the external storage medium according to a second external operation; and a display control unit operable to display video on a screen of the display unit based on the video data read from the external storage medium by the read/write unit.

As a result, in the video display apparatus of the present invention, video data, such as user-desired scenes from the video displayed on the display unit, may be stored in the external storage medium and subsequently removed from the video display apparatus.

Further, the present invention provides a video display method including sequentially updating and temporarily storing video data of video being displayed on a display unit; writing the stored video data into an external storage medium according to a first external operation; reading the video data from the external storage medium according to a second external operation; and displaying video on the display unit based on the video data read from the external storage medium.

As a result, with the video display method of the present invention, video data, such as user-desired scenes from the video displayed on the display unit, may be stored in the external storage medium and removed from the apparatus as desired.

The nature, principle and utility of the invention will become more apparent from the following detailed description when read in conjunction with the accompanying drawings in which like parts are designated by like reference numerals or characters.

BRIEF DESCRIPTION OF THE DRAWINGS

Preferred embodiments of this invention will be described with reference to the accompanying drawings in which.

Figure 1:
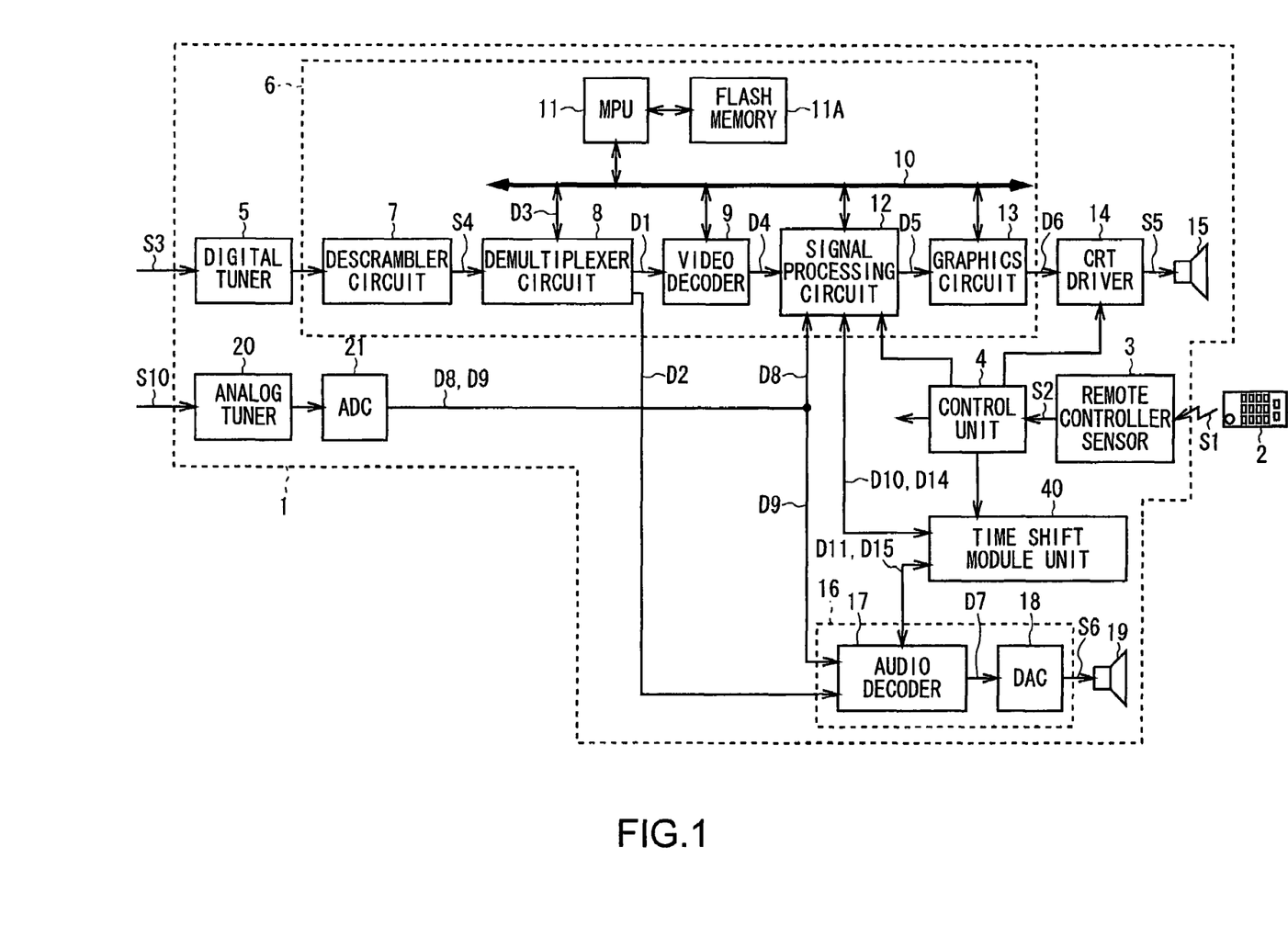
FIG. 1 is a block diagram showing a construction of a television receiver according to this embodiment.

DETAILED DESCRIPTION (1) Construction of Television Receiver According to This Embodiment Referring to FIG. 1, reference numeral 1 shows a television receiver according to this embodiment which is designed to be able to display video and output sound of a designated channel. In the television receiver 1, a remote controller sensor 3 receives an infrared signal S1 which is output from a remote controller 2 according to a user operation and a microcomputer control unit 4 controls various processes according to a received signal S2 which is output from the remote controller sensor 3 in response to the infrared signal S1.

In television receiver 1, digital television signals from broadcasting satellite (BS) broadcasts, communication satellite (CS) broadcasts and digital terrestrial broadcasts are received by a first antenna (not shown) for digital broadcasts and input into a digital tuner 5. Under the control of the control unit 4, the digital tuner 5 selects a digital television signal S3 of a user-designated channel from the received digital television signals S3 of various channels, and sends this signal to a descrambler circuit 7 of a video block 6.

The descrambler circuit 7 descrambles the received digital television signal S3 to decrypt the encryption of the signal S3, and sends the resultant descrambled television signal S4 to a demultiplexer 8.

The demultiplexer 8 divides the descrambled television signal S4 into encoded video data D1, encoded audio data D2, and service data D3, and sends the data respectively to a video decoder 9, to an audio decoder 17 of an audio block 16, and, via a bus 10, to a microprocessor unit (MPU) 11 for controlling the entire operation of the video block 6.

Under the control of the MPU 11, the video decoder 9 performs a prescribed decoding process, such as a motion picture experts group (MPEG) decoding process, on the received encoded video data D1, and sends the decoded video data D4 of, for example, an international telecommunication union (ITU)-R656 format to a signal processing circuit 12.

The signal processing circuit 12 performs prescribed signal processing on video data D4, D8 of a user-designated channel out of the video data D4 received from the video decoder 9 and the video data D8 which is received from an analog-to-digital converter 21, as described later. The signal processing includes, for example, video format conversion (for example, conversion from video data of 1920×1080 pixels to video data of 720×480 pixels) and the creation of a picture-in-picture (PIP) screen, which will be described later. Then the signal processing circuit 12 sends the resultant signal-processed video data D5 to a graphics circuit 13.

The graphics circuit 13, under the control of the MPU 11, creates graphics, such as an electronic program guide (EPG) and various menus, superimposes the graphics onto the signal-processed video data D5, and sends the result to a cathode-ray tube (CRT) driver 14 as graphics-superimposed video data D6.

The CRT driver 14, under the control of the control unit 4, performs prescribed signal processing on the graphics-superimposed video data D6. The signal processing includes, for example, conversion of the graphics-superimposed video data D6 into data of an RGB format and digital-to-analog conversion of the graphics-superimposed video data D6 into an analog signal. Then the CRT driver 14 sends the resultant analog video signal S5 to a display 15, so as to display video based on the analog video signal S5.

The audio decoder 17, on the other hand, selects encoded audio data D2 or audio data D9 of the user-designated channel, out of the encoded audio data D2 received from the demultiplexer circuit 8 and the audio data D9 received from the analog-to-digital converter 21, as described later.

When the audio decoder 17 selects the encoded audio data D2 received from the demultiplexer circuit 8, it performs a prescribed decoding process, such as a pulse code modulation (PCM) decoding process, on this data D2. Then the audio decoder 17 sends the decoded audio data of a PCM format to the digital-to-analog converter 18 as selected audio data D7. On the contrary, when the audio decoder 17 selects the audio data D9 received from the analog-to-digital converter 21, it sends this data to the digital-to-analog converter 18 as selected audio data D7 without change.

The digital-to-analog converter 18 performs digital-to-analog conversion on the received selected audio data D7 and sends the resultant analog audio signal S6 to a loudspeaker 19, thus outputting sound based on this analog audio signal S6.

By the way, television receiver 1 is provided with an analog tuner 20 for receiving analog terrestrial television broadcasts, and inputs analog television signals S10 received via a second antenna (not shown) for analog terrestrial broadcasts into the analog tuner 20.

Under the control of the control unit 4, the analog tuner 20 selects an analog television signal S10 of a user-designated channel from the received analog television signals S10 of various channels, and sends it to the analog-to-digital converter 21.

The analog-to-digital converter 21 converts the received analog television signal S10 to digital data, and sends the resultant video data D8 to the signal processing circuit 12 of the video block 6 and the resultant audio data D9 to the audio decoder 17 of the audio block 16.

As a result, when the user has designated the channel of the data, the video data D8 is selected in the signal processing circuit 12 under the control of the control unit 4, so as to display video based on the video data D8 on the display 15 in the above-described manner. In addition, the audio data D9 is selected in the audio decoder 17, so as to output sound based on the audio data D9 from the loudspeaker 19 in the above-described manner.

As described above, the television receiver 1 is designed to be able to display video and output sound of user-designated BS broadcasts, CS broadcasts or digital terrestrial broadcasts or video and sound of analog terrestrial broadcasts on the display 15 and from the loudspeaker 19.

Figures 2A, 2B, 2C:
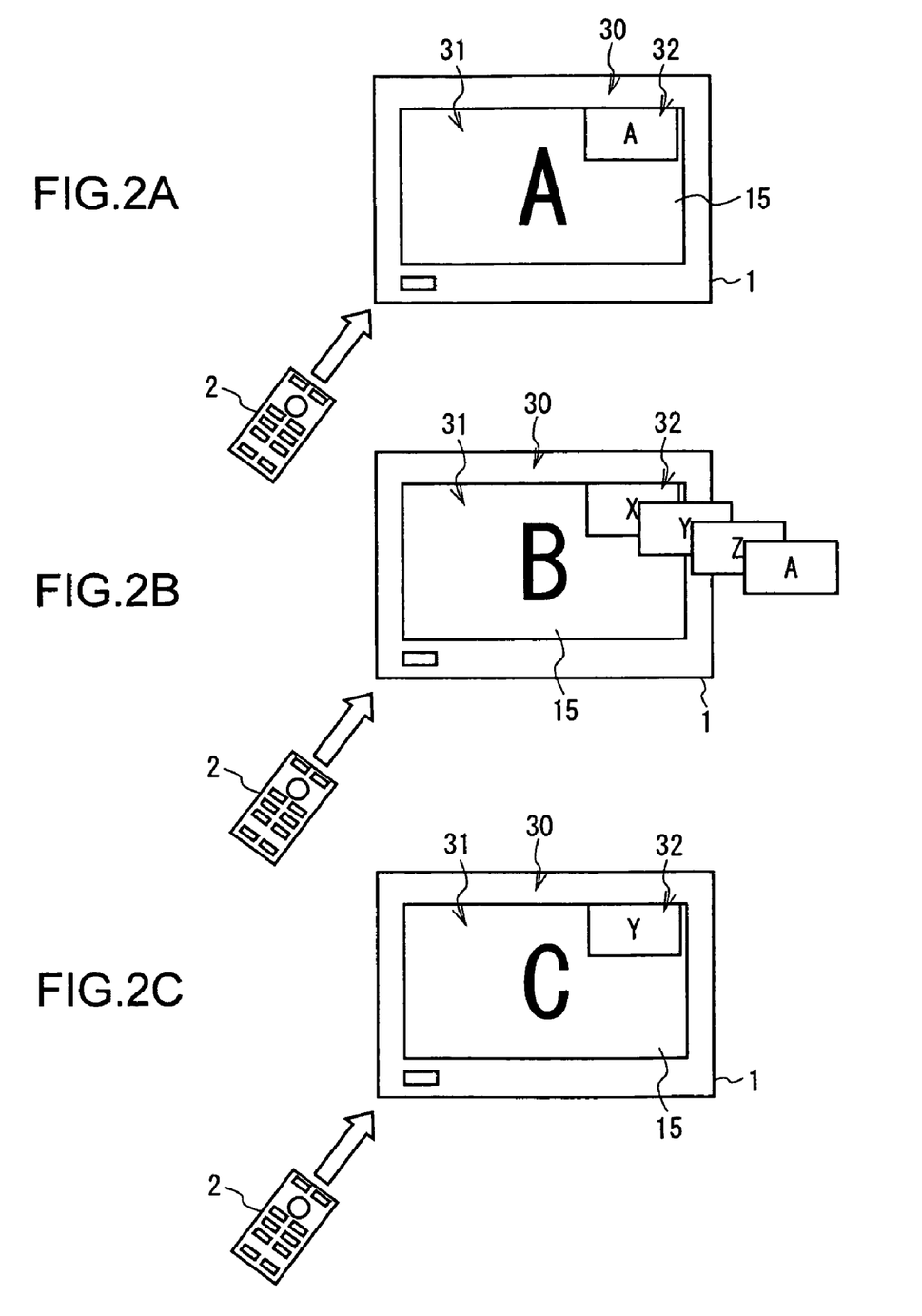
FIGS. 2A to 2C are schematic diagrams explaining trick play according to this embodiment.

In addition to the above configuration, the television receiver 1 has a trick play function. That is, when a user presses a "pause" button on the remote controller 2 while watching television, the still picture at that moment is displayed on a sub-screen 32 as shown in FIG. 2A. Further, pressing a "fast forward" button, "fast reverse" button, "frame forward" button or "frame reverse" button on the remote controller 2 in this situation allows the trick play; video on the sub-screen 32 is in a trick play mode allowing fast forward, fast reverse, frame forward, and frame reverse for a few to a dozen seconds before the moment the "pause" button was pressed, as shown in FIGS. 2B and 2C.

Figure 3:
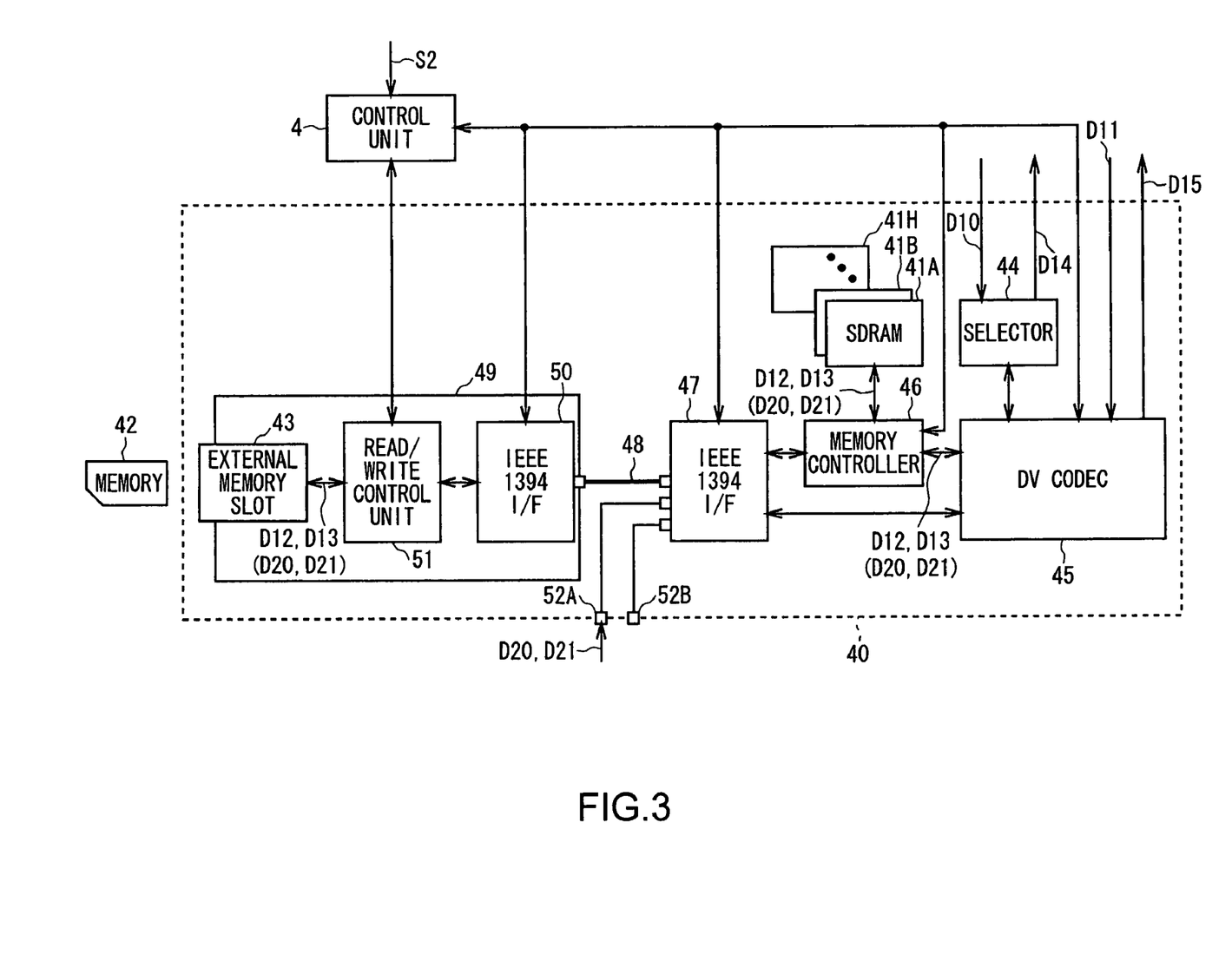
FIG. 3 is a block diagram showing a construction of a time shift module unit.

As a means to realize this trick play function, the television receiver 1 is provided with a time shift module unit 40 which contains eight synchronous dynamic RAMs (SRAM) 41A to 41H, each having a storage capacity of, for example, 128 Mbits and a slot 43 allowing free insertion and removal of a portable external memory 42, such as a Memory Stick (trademark of Sony Corporation), as shown in FIG. 3.

The time shift module unit 40 receives video data D10 (video data D4 or video data D8) and audio data D11 (audio data D2 or audio data D9) of a television channel which the user is watching (hereinafter referred to as a user-watched channel) from the signal processing circuit 12 of the video block 6 and the audio decoder 17 of the audio block 16, respectively, as shown in FIG. 1.

The time shift module unit 40 inputs the received video data D10 of, for example, the ITU-R656 format to a digital video (DV) CODEC 45 via a selector 44 and inputs the received audio data D11 of, for example, the PCM format to the DV CODEC 45. The DV CODEC 45 converts the video and audio data to data of a DV format and sends the resultant DV video data D12 and DV audio data D13 of the DV format to a memory controller 46.

With the storage regions of the eight SDRAMs 41A to 41H as a single storage region, the memory controller 46 sequentially writes the DV video data D12 and DV audio data D13 received from the DV CODEC 45 in the storage region by overwriting the old data. In this way, the time shift module unit 40 is designed to sequentially update and temporarily store the DV video data D12 and DV audio data D13 of the user-watched channel for the previous few to a dozen seconds in real time in these eight SDRAMs 41A to 41H.

By the way, when the user presses the "pause" button on the remote controller 2 while watching a desired channel, a received signal S2 according to this operation is output from the remote controller sensor 3 (FIG. 1) to the control unit 4. The control unit 4 outputs a command based on the received signal S2 to the memory controller 46.

When the memory controller 46 receives this command, it stops the writing of the DV video data D12 and DV audio data D13 into the SDRAMs 41A to 41H, reads the DV video data D12 of the last frame stored in the SDRAMs 41A to 41H, which is the DV video data D12 of the frame on the user-watched channel at the moment the user pressed the "pause" button on the remote controller 2, and sends this to the DV CODEC 45.

The DV CODEC 45 obtains video data D14 of the ITU-R656 format by decoding this frame of DV video data D12, and outputs this to the signal processing circuit 12 (FIG. 1) via the selector 44.

Upon receiving the frame of DV video data D14 from the DV CODEC 45, the signal processing circuit 12 creates video data for a video screen for displaying video based on the video data D10 of the user-watched channel in the main screen 31 (FIGS. 2A to 2C) and video (still picture) based on the frame of video data D14 from the DV CODEC 45 in the sub-screen 32 (FIGS. 2A to 2C), and sends this to the graphics circuit 13 as signal-processed video data D5.

As a result, based on the signal-processed video data D5, a PinP screen 30 is displayed on the display 15 as shown in FIG. 2A, where the still picture of the user-watched channel at the moment the user presses the "pause" button of the remote controller 2 is displayed in the sub-screen 32 positioned in the upper right corner of the main screen 31 which displays video of the user-watched channel in real time.

In parallel to this process, the memory controller 46 sequentially reads all DV video data D12 and DV audio data D13 from the SDRAMs 41A to 41H, and sends them to an Institute of Electrical and Electronics Engineers (IEEE) 1394 interface 47. The IEEE 1394 interface 47 is connected to an IEEE1394 interface 50 of an external memory module unit 49 by an IEEE1394 serial bus 48, and sends the DV video data D12 and DV audio data D13 received from the memory controller 46 to a read/write control unit 51 of the external memory module unit 49 via the IEEE1394 serial bus 48 and the IEEE1394 interface 50. The read/write control unit 51 stores the DV video data D12 and the DV audio data D13 received from the memory controller 46 in the external memory 42 inserted in the slot 43. In this way, when the user presses the "pause" button of the remote controller 2, the time shift module unit 40 stores the DV video data D12 and the DV audio data D13 stored in the SDRAMs 41A to 41H in the external memory 42.

When the user presses the "fast forward" button, "fast reverse" button, "slow playback forward" button, "slow playback reverse" button, "normal-speed playback forward" button, "normal-speed playback reverse" button, "frame forward" button or "frame reverse" button in this situation, a received signal S2 according to this operation is output from the remote controller sensor 3 (FIG. 1) to the control unit 4. The control unit 4 outputs a command based on the received signal S2 to the read/write control unit 51 of the time shift module unit 40.

At this time, the read/write control unit 51 reads the DV video data D12 and DV audio data D13 from the external memory 42 in a readout mode specified by this command and sends this data to the IEEE1394 interface 50.

Specifically, when the read/write control unit 51 receives a command based on the pressing of the "fast forward" button or "fast reverse" button of the remote controller 2, for example, it sequentially reads the DV video data D12 and corresponding DV audio data D13 from the external memory 42 for every several frames in a past or future direction. When the read/write control unit 51 receives a command based on the pressing of the "slow playback forward" button or "slow playback reverse" button of the remote controller 2, it repeatedly and sequentially reads the DV video data D12 and corresponding DV audio data D13 from the external memory 42 several times for each frame in a past or future direction. The read/write control unit 51 sends the read data to the IEEE1394 interface 50.

When the read/write control unit 51 receives a command based on the pressing of the "normal-speed playback forward" button or "normal-speed playback reverse" button of the remote controller 2, it sequentially reads the DV video data 12 and corresponding DV audio data D13 from the external memory 42 for each frame in a past or future direction. When the read/write control unit 51 receives a command based on the pressing of the "frame forward" button or "frame reverse" button of the remote controller 2, it repeatedly reads the DV video data D12 and corresponding DV audio data D13 from the external memory 42 for only one frame in a past or future direction. The read/write control unit 51 sends the read data to the IEEE1394 interface 50.

Then the DV video data D12 and DV audio data D13 read from the external memory 42 are sent to the DV CODEC 45 via the IEEE1394 interface 50, the IEEE1394 serial bus 48, and the IEEE1394 interface 47, and are converted into the video data D14 of the ITU-R656 format and the audio data D15 of the PCM format in the DV CODEC 45.

The DV CODEC 45 sends the resultant video data D14 of the ITU-R656 format to the signal processing circuit 12 (FIG. 1) via the selector 44, and sends the resultant audio data D15 of the PCM format to the audio decoder 17 (FIG. 1).

At this time, the signal processing circuit 12 sequentially creates video data for the PinP screen 30 for displaying video based on the video data D10 of the user-watched channel in the main screen 31 (FIGS. 2A to 2C) and video based on the video data D14 received from the time shift module unit 40 in the sub-screen 32 (FIGS. 2A to 2C), and sends this to the graphics circuit 13 as signal-processed video data D5.

As a result, as shown in FIGS. 2B and 2C, video in the sub-screen 32 of the PinP screen 30 described above with reference to FIG. 2A is replayed in a display mode corresponding to the readout mode, such as fast forward, fast reverse, frame forward or frame reverse, which corresponds to the user's pressing operation on the "fast forward" button, "fast reverse" button, "frame forward" button or "frame reverse" button of the remote controller 2.

As described above, television receiver 1 can perform the trick play, such as "fast forward", "fast reverse", "frame forward" and "frame reverse", on video in the sub-screen 32 of the PinP screen 30 for a few to a dozen seconds before the moment the user pressed the "pause" button of the remote controller 2.

In addition, when the user presses a "screen switching" button of the remote controller 2 while such PinP screen 30 is displayed on the display 15, a received signal S2 according to this operation is output from the remote controller sensor 3 to the control unit 4. The control unit 4 outputs a command based on the received signal S2 to the signal processing circuit 12 and the audio decoder 17.

Upon reception of this command, the signal processing circuit 12 creates video data for displaying the video which has been displayed on the main screen 31 on the sub-screen 32, and for displaying the video which has been displayed on the sub-screen 32 on the main screen 31, and sends this video data to the graphics circuit 13 as signal-processed video data D5.

On the other hand, the audio decoder 17, upon reception of that command, selects the audio data D15 received from the time shift module unit 40, instead of the audio data D11 of the user-watched channel, and outputs this as selected audio data D7 to the digital-to-analog converter 18.

As a result, the video on the main screen 31 and the video on the sub-screen 32 on the PinP screen 30 described above with reference to FIGS. 2A to 2C are switched and displayed on the display 15. In addition, sound corresponding to the video to be displayed on the main screen 31 is output from the loudspeaker 19. It should be noted that, at this time, the sub-screen 32 displays video of the user-watched channel in real time.

When the user presses the "fast forward" button, "fast reverse" button, "frame forward" button, or "frame reverse" button of the remote controller 2 in this situation, a received signal S2 according to this operation is output from the remote controller sensor 3 to the control unit 4. Upon reception of the received signal S2, the control unit 4 controls the signal processing circuit 12, the time shift module unit 40, etc. as in the above-described case of displaying video on the sub-screen 32 of the PinP screen 30 based on the DV video data D12 (FIG. 3) stored in the external memory 42.

As a result, video on the main screen 31 of the PinP screen 30 described above with reference to FIGS. 2A to 2C is replayed on the display 15 (FIG. 1) in a display mode such as fast forward, fast reverse, frame forward or frame reverse corresponding to the user's pressing operation on the "fast forward" button, "fast reverse" button, "frame forward" button or "frame reverse" button of the remote controller 2, and sound corresponding to the video on the main screen 31 is output from the loudspeaker 19 (FIG. 1).

As described above, television receiver 1 is able to perform the trick play on video and sound on the main screen 31 of the PinP screen 30 for a few to a dozen seconds before the user's pressing of the "pause" button of the remote controller 2.

By the way, in television receiver 1, the memory controller 46 (FIG. 3) of the time shift module unit 40 sequentially updates and writes the DV formatted video data D12 and audio data D13 of the user-watched channel sequentially received from the DV CODEC 45 in the SDRAMs 41A to 41H, even while the PinP screen 30 described above with reference to FIG. 2A is displayed on the display 15 (FIG. 1).

When the user presses the "pause", button of the remote controller 2 while the PinP screen 30 is displayed on the display 15 and the control unit 4 receives the received signal S2 based on this operation from the remote controller sensor 3, the control unit 4 controls the memory controller 46 and the read/write control unit 51 of the time shift module unit 40 and the signal processing circuit 12 (FIG. 1) as in the above-described case. As a result, as described above with reference to FIGS. 2A to 2C, the still picture of the user-watched channel at the moment the user presses the "pause" button of the remote controller 2 is displayed on the sub-screen 32 of the PinP screen 30 on the display 15, and the DV video data S12 and DV audio data D13 being stored in the SDRAM 41A to 41H are stored in the external memory 42.

Then when the user presses the "fast forward" button, "fast reverse" button, "frame forward" button, or "frame reverse" button of the remote controller 2 under this situation, a received signal S2 according to this operation is output from the remote controller sensor 3 (FIG. 1) to the control unit 4. Upon reception of the received signal S2, the control unit 4 controls the signal processing circuit 12, the time shift module unit 40, etc., as in the above-described case, so as to replay video on the sub-screen 32 of the PinP screen 30 in a display mode, such as fast forward, fast reverse, frame forward or frame reverse, corresponding to the user's pressing operation on the "fast forward" button, "fast reverse" button, "frame forward" button, or "frame reverse" button of the remote controller 2. In this way, even while the trick play is being performed, the television receiver 1 is able to display user-desired scenes of the user-watched channel on the PinP screen 30 (FIGS. 2A to 2C) according to the pressing operation on the "pause" button of the remote controller 2.

By the way, in the television receiver 1 of this embodiment, the IEEE1394 interface 47 and the IEEE1394 interface 50 of the time shift module unit 40 communicate with each other with a digital transmission content protection (DTCP) method which is a communication method for copyright protection.

Specifically, the IEEE1394 interface 47 identifies the IEEE1394 interface 50 when outputting DV video data D12 and DV audio data D13, which are read from the SDRAMs 41A to 41H and received from the memory controller 46, to the IEEE1394 interface 50. Only when the IEEE1394 interface 50 can be identified does the IEEE1394 interface 47 encrypt and send the DV video data D12 and DV audio data D13 to the IEEE1394 interface 50 together with copy control information ("copy never", "one-generation copyable", or "copyable").

As a result, the encrypted DV video data D12 and DV audio data D13 are output to the read/write control unit 51 via the IEEE1394 interface 50 together with the copy control information and are stored in the external memory 42 together with the copy control information without change.

For the above-described trick play of the DV video data D12 and DV audio data D13 stored in the external memory 42, the read/write control unit 51 reads the DV video data D12 and DV audio data D13 from the external memory 42 and outputs these to the IEEE1394 interface 50.

When the IEEE1394 interface 50 sends the DV video data D12 and DV audio data D13 to the IEEE1394 interface 47, it identifies the IEEE1394 interface 47. When the IEEE1394 interface 47 can be identified, the IEEE1394 interface 50 outputs the DV video data D12 and DV audio data D13 to the IEEE1394 interface 47 via the IEEE1394 serial bus 48 without change. The IEEE1394 interface 47 decrypts the encryption of the received DV video data D12 and DV audio data D13, and sends the decrypted DV video data D12 and DV audio data D13 to the DV CODEC 45.

As described above, in the television receiver 1, the digital transmission content protection (DTCP) method is employed as a communication method between the IEEE1394 interface 47 and the IEEE1394 interface 50 of the time shift module unit 40. And by storing the DV video data D12 and DV audio data D13 in a format based on this method in the external memory 42, the DV video data D12 and DV audio data D13 stored in the external memory 42 can be previously and effectively prevented from being copied illegally even when the external memory 42 is taken out of the television receiver 1 and used on another video device.

Further, in the television receiver 1 according to this embodiment, as shown in FIG. 3, the IEEE1394 interface 47 of the time shift module unit 40 is connected to external input terminals 52A and 52B which are arranged on the front or back side of the television receiver 1, so as to take DV video data D20 and DV audio data D21 from an external video device, such as a DV camcorder connected to the external input terminals 52A, 52B, into the time shift module unit 40.

The DV video data D20 and DV audio data D21 from the external video device are sent to the DV CODEC 45 via the IEEE1394 interface 47, converted into video data D14 of the ITU-R656 format and audio data D15 of the PCM format in the DV CODEC 45, and then sent to the signal processing circuit 12 (FIG. 1) and the audio decoder 17 (FIG. 1), respectively.

When the user selects a "video input mode" as an input mode by operating the remote controller 2 and a received signal S2 according to this operation is output from the remote controller sensor 3 to the control unit 4, the control unit 4 controls the signal processing circuit 12 and the audio decoder 17 according to this signal.

Thus, the signal processing circuit 12 selects the video data D14 received from the time shift module unit 40, performs prescribed signal processes on the video data D14, and sends the result to the graphics circuit 13 (FIG. 1) as signal-processed video data D5 (FIG. 1). As a result, video based on the signal-processed video data D5 is displayed on the display 15.

In addition, at this time, the audio decoder 17 selects the audio data D15 received from the time shift module unit 40 and sends it to the digital-to-analog converter 18 as selected audio data D7. As a result, sound based on the selected audio data D7 is output from the loudspeaker 19.

On the other hand, the DV video data D20 and DV audio data D21 input from the external video device via the external input terminals 52A, 52B are also entered into the memory controller 46 via the IEEE1394 interface 47 of the time shift module unit 40 shown in FIG. 3. The memory controller 46 sequentially updates and stores the DV video data D20 and DV audio data D21 in the SDRAMs 41A to 41H as in the above-described case of the DV video data D12 and DV audio data D13.

When the user presses the "pause" button of the remote controller 2 in this situation, the PinP screen 30 is displayed on the display 15 (FIG. 1), where a still picture being viewed at the moment the user presses the "pause" button of the remote controller 2 is displayed on the sub-screen 32 and real-time video based on the DV video data D20 from the external video device is displayed on the main screen 31, as in the above-descried case where the user watches a desired television program. In addition, the DV video data D20 and DV audio data D21 from the external video device, which are being stored in the SDRAMs 41A to 41H, are stored in the external memory 42.

When the user presses the "fast forward" button, "fast reverse" button, "frame forward" button, or "frame reverse" button of the remote controller 2 in this situation, video on the sub-screen 32 (FIGS. 2A to 2C) of the PinP screen 30 (FIGS. 2A to 2C) is placed in a display mode such as fast forward, fast reverse, frame forward or frame reverse depending on the button of the remote controller 2 pressed by the user, as in the above-described case where the user watches a desired television program.

In addition, when the user presses the "screen switching" button of the remote controller 2 in a situation where the PinP screen 30 is displayed on the display 15, the video on the main screen 31 and the video on the sub-screen 32 are switched, and sound corresponding to the video to be displayed on the main screen 31 is output from the loudspeaker 19 (FIG. 1).

As described above, when the user is watching not only television but also video based on the DV video data D20 and DV audio data D21 supplied from an external video device, television receiver 1 is able to perform the trick play.

(2) Processing Contents of Control Unit 4 Relating to the Trick Play Function

Figure 4:
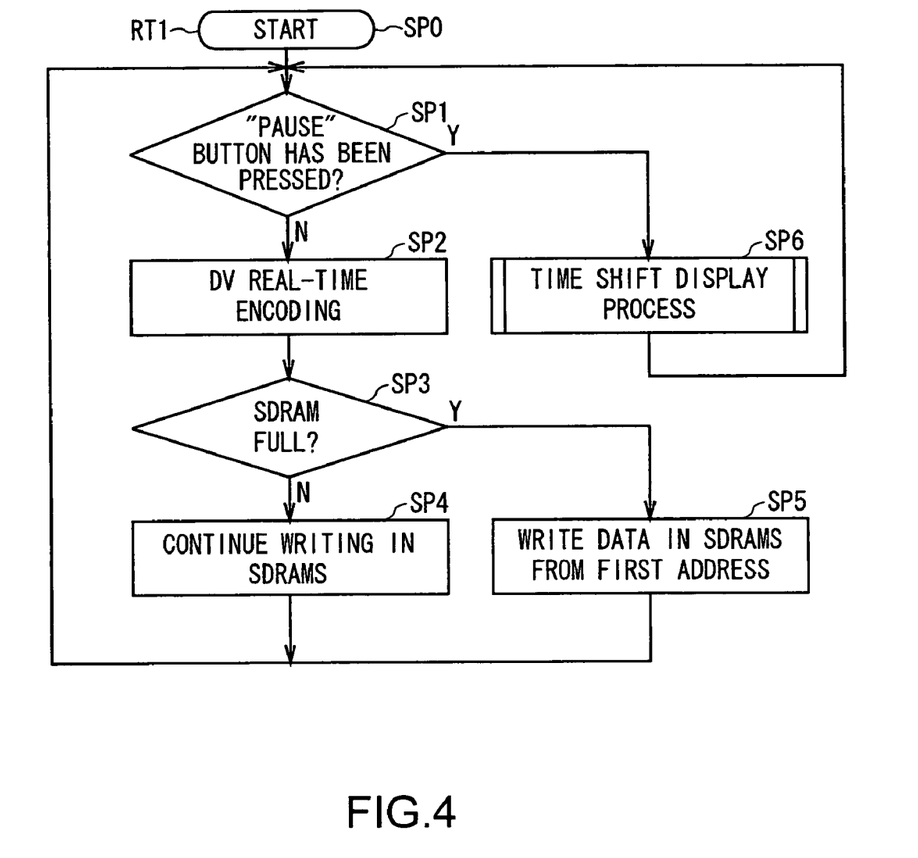
FIG. 4 is a flowchart showing a procedure for trick play display.

The control unit 4 controls the signal processing unit 12 (FIG. 1), the audio decoder 17 (FIG. 1), and the time shift module unit 40 based on a procedure RT1 for trick play, as shown in FIG. 4, so that the television receiver 1 can perform the above-described trick play while the user is watching television.

That is, when the user turns on the television receiver 1, the control unit 4 starts the trick play procedure RT1 from step SP0. In the next step SP1, the control unit 4 determines, based on a signal S2 received from the remote controller sensor 3 (FIG. 1), whether the "pause" button of the remote controller 2 has been pressed.

When a negative result is obtained in step SP1, the process goes on to step SP2 where the control unit 4 controls the DV CODEC 45 (FIG. 3) of the time shift module unit 40 so that the DV CODEC 45 converts the video data D10 and audio data D11 of the user-watched channel into data of the DV format.

The process then goes on to step SP3 where the control unit 4 determines whether a once through writing of the DV video data D12 and DV audio data 13 in the eight SDRAMs 41A to 41H (FIG. 3) has been finished, that is, whether the DV video data D12 and DV audio data D13 have been stored in a series of the storage regions of the eight SDRAMs 41A to 41H from the fist address to the last address.

When a negative result is obtained in step SP3, the process goes on to step SP4 where the control unit 4 controls the memory controller 46 (FIG. 3) so as to continue writing the DV video data and DV audio data which are received from the DV CODEC 45 to the memory controller, and then the process returns to step SP1.

When an affirmative result is obtained in step SP3, on the contrary, the process goes on to step SP5 where the control unit 4 controls the memory controller 46 so as to start to store the DV video data D12 and DV audio data D13 which are received from the DV CODEC 45 to the memory controller 46, in a series of the storage regions of the eight SDRAMs 41A to 41H beginning with the first address. Then the process returns to step SP1.

The control unit 4 repeats step S1 to step SP5 until an affirmative result is obtained in step 1, that is, until the user presses the "pause" button of the remote controller 2. As described above, the control unit 4 sequentially updates and stores the DV video data D12 and DV audio data D13 of the user-watched channel in the SDRAMs 41A to 41H of the time shift module unit 40.

Figure 5:
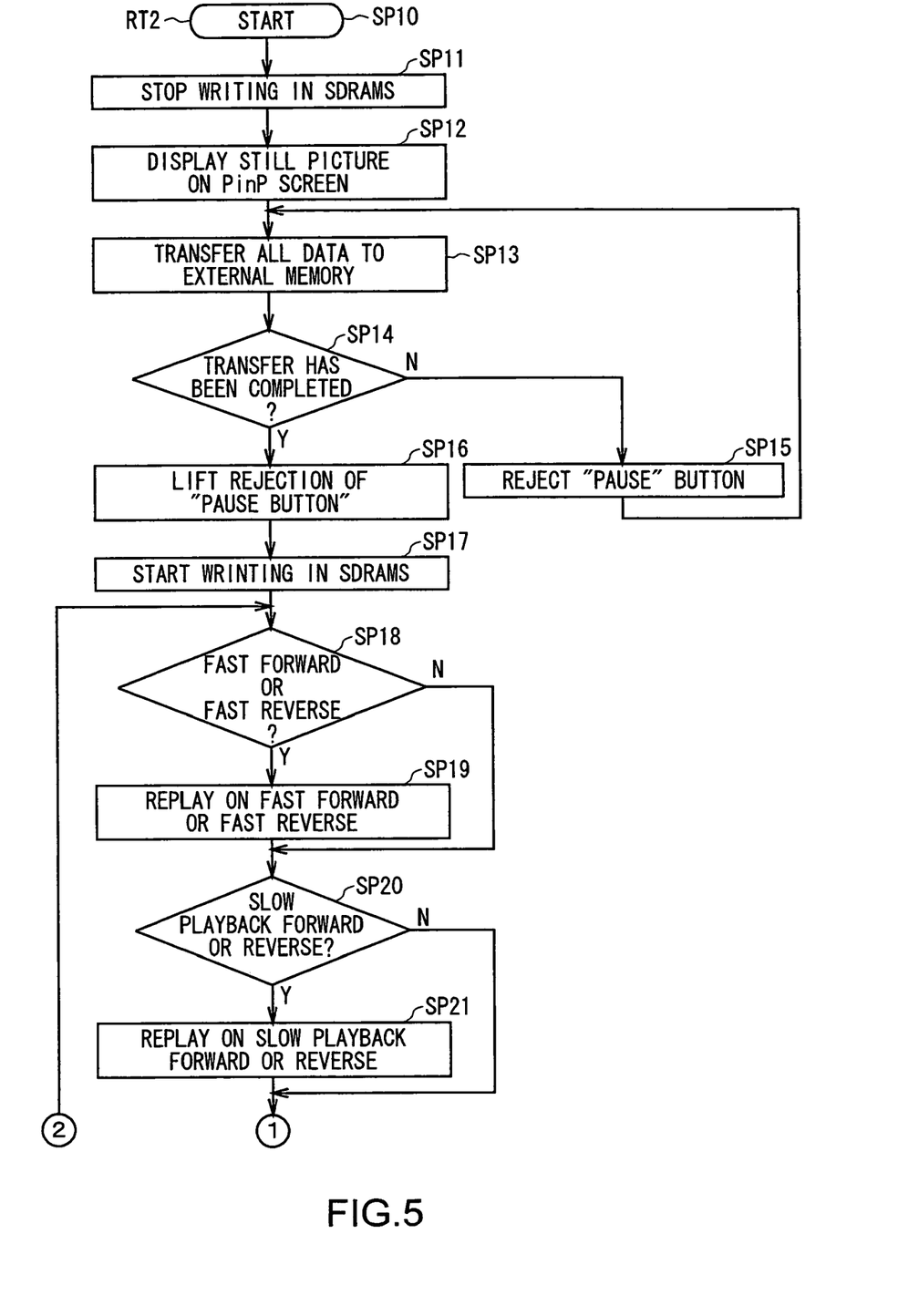
FIGS. 5 and 6 are flowcharts showing a procedure for trick play display interruption.
Figure 6:
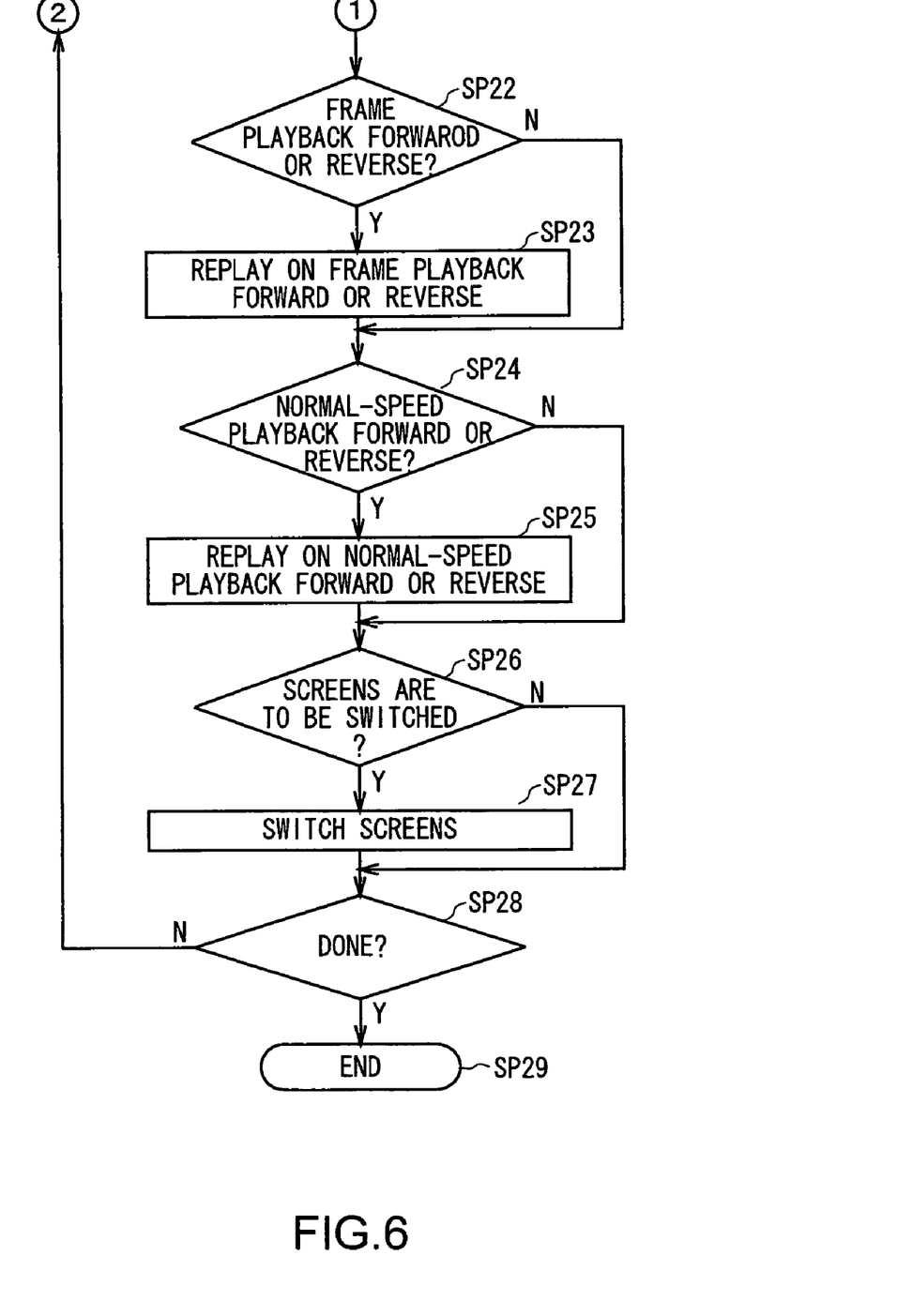

When an affirmative result is obtained in step SP1, the process goes on to step SP6 where the control unit 4 starts a time shift display interruption process RT2 shown in FIGS. 5 and 6 beginning with step SP10.

In the next step SP11, the control unit 4 controls the memory controller 46 of the time shift module unit 40 shown in FIG. 3 so as to stop the writing of the DV video data D12 and DV audio data D13 in the SDRAMs 41A to 41H.

In the next step S12, the control unit 4 controls the memory controller 46 and the DV CODEC 45 so that the memory controller 46 reads the DV video data D12 of the last frame written in the SDRAMs 41A to 41H from the SDRAMs 41A to 41H, and the DV CODEC 45 then converts this data into video data D14 of the ITU-R656 format and sends this to the signal processing circuit 12 (FIG. 1).

In addition, the control unit 4 controls the signal processing circuit 12 so as to create signal-processed video data D5 (FIG. 1) for displaying video based on the video data D10 (FIG. 1) of the user-watched channel on the main screen 31

(FIGS. 2A to 2C) and video (still picture) based on the one frame of video data D14 received from the time shift module unit 40 (FIGS. 2A to 2C), and sends this to the graphics circuit 13. Thus, the control unit 4 displays the video of the user-watched channel at the moment the user pressed the "pause" button of the remote controller 2 on the sub-screen 32 of the PinP screen 30 (FIG. 2A) as a still picture.

The process goes on to step SP13 where the control unit 4 controls the memory controller 46 of the time shift module unit 40 so as to sequentially read the DV video data D12 and DV audio data D13 from the SDRAMs 41A to 41H beginning with an address next to the address storing the DV video data D12 and DV audio data of the last frame, and sends them to the IEEE1394 interface 47.

In addition, the control unit 40 controls the read/write control unit 51 of the time shift module unit 40 so as to sequentially write the DV video data D12 and DV audio data D13 which are sent from the IEEE1394 interface 47 to the read/write control unit 51 via the IEEE1394 serial bus 48, in the external memory 42 from an address next to the address in which the DV video data D12 and DV audio data D13 of the last frame were stored in the previous writing of the DV video data D12 and DV audio data D13.

The process goes on to step SP14 where the control unit 4 determines whether all of the DV video data D12 and DV audio data D13 stored in the SDRAMs 41A to 41H have been transferred to the read/write control unit 51.

When a negative result is obtained in step SP14, the process goes on to step SP15 where the control unit 4 sets its operation mode to an operation mode (hereinafter, referred to as "pause" button rejection mode) in which the user's pressing of the "pause" button of the remote controller 2 is rejected (inhibited), and then the process returns to step SP13. The control unit 4 then repeats a loop of steps SP13-SP14-SP15-SP13 until an affirmative result is obtained in step SP14.

When an affirmative result is obtained in step SP14, that is, when all of the DV video data D12 and DV audio data D13 stored in the SDRAMs 41A to 41H have been transferred to the read/write control unit 51, the process goes on to step SP16 where the control unit 4 changes its mode from the "pause" button rejection mode to an operation mode in which the user's pressing of the "pause" button of the remote controller 2 is accepted.

Then the process goes on to step SP17 where the control unit 4 controls the memory controller 46 so as to resume the writing of the DV video data D12 and DV audio data D13 in the SDRAMs 41A to 41H beginning with an address next to the address where the DV video data D12 and DV audio data D13 of the last frame were written in the SDRAMs 41A to 41H in step SP11.

Then in step SP18, step SP20, step SP22, and step SP24, the control unit 4 sequentially determines, based on a signal S2 received from the remote controller sensor 3, whether the "fast forward" button or "fast reverse" button of the remote controller 2 has been pressed, whether the "slow playback forward" button or "slow playback reverse" button of the remote controller 2 has been pressed, whether the "frame forward" button or "frame reverse" button of the remote controller 2 has been pressed" and whether the "normal-speed playback forward" button or "normal-speed playback reverse" button of the remote controller 2 has been pressed.

When an affirmative result is obtained in step SP18, step SP20, step SP22 or step SP24, the control unit 4 controls the read/write control unit 51 in the corresponding next step SP19, step SP21, step SP23 or step SP25 so as to read the DV video data D12 and DV audio data D13 from the external memory 42 in a corresponding readout mode.

As a result, the DV video data D12 and DV audio data D13 read from the external memory 42 are given to the DV CODEC 45 via the IEEE1394 interface 50, the IEEE1394 serial bus 48, and the IEEE13894 interface 47. The DV CODEC 45 then converts these data into video data D14 of the ITU-R656 format and audio data D15 of the PCM format.

In addition, the control unit 4 controls the signal processing circuit 12 to perform prescribed signal processes, thereby displaying video based on the ITU-R656 formatted video data D14 output from the DV CODEC 45 on the sub-screen 32 of the PinP screen 30 on the display 15.

The process goes on to step SP26 where the control unit 4 determines, based on a signal S2 received from the remote controller sensor 3, whether the "screen switching" button of the remote controller 2 has been pressed.

When an affirmative result is obtained in step SP26, the process goes on to step SP27 where the control unit 4 controls the signal processing circuit 12 so as to execute signal processes for switching the video on the main screen 31 and the video on the sub-screen 32 on the PinP screen 30 of the display 15, and also controls the audio decoder 17 so as to select the audio data D15 output from the time shift module unit 40 and send it to the digital-to-analog converter 18.

As described above, when an affirmative result is obtained in step SP26, the control unit 4 displays video based on the DV video data D12 stored in the external memory 42 on the main screen 31 and outputs sound based on the DV audio data D13 stored in the external memory 42 from the loudspeaker 19. Then the process goes on to step SP28.

When a negative result is obtained in step SP26, on the contrary, the process goes directly to step SP28.

In step SP28, the control unit 4 determines, based on a signal S2 received from the remote controller sensor 3, whether a "two-screen display end" button of the remote controller 2 has been pressed.

When a negative result is obtained in step SP28, the process returns to step SP18 and then the control unit 4 repeats a loop of step SP18 to step SP28 until an affirmative result is obtained in step SP28.

When an affirmative result is obtained in step SP28, that is, when the user has pressed the "two-screen display end" button of the remote controller 2, the process goes on to step SP29 where the control unit 4 terminates this time shift display interruption procedure RT2 and returns to step SP1 of the trick play procedure RT1 (FIG. 4).

As described above, the control unit 4 makes the television receiver 1 perform the trick play according to the user's operation on the remote controller 2 while the user is watching television.

(3) Operation and Effects of this Embodiment

According to the above configuration, the television receiver 1 sequentially updates and stores video data D10 and audio data D11 of a television program that a user is watching, or DV video data D20 and DV audio data D21 received from an external video device while the user is watching video from the external device, in the SDRAMs 41A to 41H of the time shift module unit 40 for a few to a dozen seconds before the "pause" button of the remote controller 2 is pressed.

When the "pause" button of the remote controller 2 is pressed, the television receiver 1 stores the DV video data D12, D20 and DV audio data D13, D21 stored in the SDRAMs 41A to 41H into an external memory 42 inserted in the slot 43 (FIG. 3), and then replays video and sound based on the DV video data D12, D20 and DV audio data D13, D21 stored in the external memory 42 in a display mode such as "fast forward", "fast reverse", "frame forward" or "frame reverse" corresponding to the user's operation on the remote controller 2.

Thus, the television receiver 1 is able to sequentially store in the external memory 42 video and sound that the user is viewing, and also replay the stored video and audio in a user-desired display mode, such as "fast forward", "fast reverse", "frame forward", or "frame reverse". This allows the user to easily search video being replayed for desired scenes.

In this case, a method can be considered in which the video data D10 and audio data D11 of a television program that the user is watching or the DV video data D20 and DV audio data D21 output from the external device that the user is viewing are sequentially updated and directly stored in the external memory 42 without using the SDRAMs 41A to 41H of the time shift module unit 40. Such method, however, would not be practical because a flash memory which can be used as the external memory 42 can store data only 100 thousand times.

Therefore, by using the SDRAMs 41A to 41H which can write data repeatedly more than the flash memory, DV video data D12, D20 and DV audio data D13, D21 of a user-watched channel, etc. are sequentially updated and stored in the SDRAMs 41A to 41H in a normal operation, and only when the "pause" button of the remote controller 2 is pressed are the DV video data D12, D20 and DV audio data D13, D21 stored in the SDRAMs 41A to 41H stored in the external memory 42. As a result, the user can create an archive of user-desired scenes in the external memory 42 without considering as a limitation the number of times the external memory 42 has been written to.

In addition, by using the SDRAMs 41A to 41H as described above, even in a case of resuming the writing in the SDRAMs 41A to 41H of the video data D10 and audio data D11 of a television program that the user is watching or the DV video data D20 and DV audio data D21 given from an external video device supplying video that the user is viewing while the PinP screen 30 is displayed, the accidental overwriting and deletion of the DV video data D12, D20 and audio data D13, D21 of the video and sound under the trick play can be effectively prevented.

Furthermore, by using the external memory 42, user-desired video and sound can be removed from the television receiver 1. In addition, by using an external memory 42 of a large or small capacity, the user is able to decide the volume of the archive containing the user-desired video and sound, regardless of the storage capacity of the built-in SDRAMs 41A to 41H.

According to the above configuration, DV video data D12, D20 and audio data D13, D21 of a television program, etc. that the user is watching are sequentially updated and stored in the SDRAMs 41A to 41H of the time shift module unit 40 for a few to a dozen seconds, and the DV video data D12, D20 and DV audio data D13, D21 are stored in the external memory 42 only when necessary, and then the trick play is performed on the DV video data D12, D20 and DV audio data D13, D21 stored in the external memory 42. Therefore, an archive containing user-desired video and sound can be created in the external memory 42 and removed from the television receiver, thus making it possible to realize a television receiver which offers significantly improved functionality.

(4) Other Embodiments

In the embodiment described above, this invention is applied to the television receiver 1. This invention, however, is not limited to this and can be widely applied to other video display apparatus such as monitors which do not have a function to receive television broadcasts. In this case, such a video display apparatus is provided with a time shift module unit similar to that of FIG. 3 so that video data and audio data based on video information and audio information received from an external video device, such as a video tape recorder or DV camcorder, can be sequentially stored in SDRAMs which are arranged in the time shift module unit.

Further, in the embodiment described above, the trick play is performed on video and audio of a television program that the user is watching for a few to a dozen seconds before the current time. This invention, however, is not limited to this, and when an external memory 42 in which another video/audio device has stored DV video data and DV audio data is inserted in the slot 43 of the time shift module unit 40, the television receiver 1 can be designed to perform the above-described trick play on the DV video data and DV audio data stored in the external memory 42.

Furthermore, in the embodiment described above, the time shift module unit 40 has eight SDRAMs 41A to 41H, each having a storage capacity of 128 Mbits, as storage means for sequentially updating and temporarily storing the DV video data D12 and DV audio data D13 of a user-watched channel. This invention, however, is not limited to this and each SDRAM 41A to 41H does not necessarily have a storage capacity of 128 Mbits and the number of SDRAMs is not necessarily limited to eight. In addition, storage media other than the SDRAMs can be applied as the storage means.

Furthermore, in the embodiment described above, the video data D10 and audio data D11 of a user-watched channel are compressed in the DV format and temporarily stored in the SDRAMs 41A to 41H. This invention, however, is not limited to this and another compression format such as an MPEG format (MPEG1 to MPEG4) can be widely applied as the compression format.

Furthermore, in the embodiment described above, the copyright is protected for the DV video data D12, D20 and DV audio data D13, D21 stored in the external memory 42 with the DTCP method. In this invention, however, methods other than the DTCP method can be applied for copyright protection. In short, the DV video data D12, D20 and DV audio data D13, D21 stored in the SDRAMs 41A to 41H are sent to the external memory 42 using a communication method based on a prescribed copyright protection technique, and are then written in the external memory 42 in a format based on the prescribed copyright protection technique.

Furthermore, in the embodiment described above, a removable memory (external memory 42) is applied as an external storage medium for creating an archive containing user-desired video and audio. This invention, however, is not limited to this and various external storage media, such as portable hard disks, can be applied in place of the removable memory.

In the case of using a hard disk drive as the external storage medium, the DV video data D12, D20 and DV audio data D13, D21 encrypted with the DTCP method are decrypted once in the IEEE1394 interface unit 50, information necessary for the trick play is separately recorded and these data are stored on the hard disk drive after applying local encryption, such as cryptomeria cipher (C2) or triple data encryption standard (DES). In the case of reading the DV video data D12, D20 and DV audio data D13, D21, the local encryption is decrypted and a data stream applicable to the trick play is created and then encrypted with the DTCP method in the IEEE1394 interface 50 and sent to the IEEE1394 interface 47 where the encryption based on the DTCP method is decrypted.

Furthermore, in the embodiment described above, no information on the external memory 42 is displayed on the display 15. This invention, however, is not limited to this and various information read out from the external memory 42 can be displayed on the display 15. The various information may include, for example, the time when the DV video data D12, D20 and DV audio data D13, D21 were written in the external memory 42, the free storage capacity of the external memory 42 during the trick play, and the playback position in the external memory 42 where the trick play is executed.

Furthermore, in the embodiment described above, a CRT is used as the display means for displaying video. This invention, however, is not limited to this and various displays capable of displaying video, such as liquid crystal panels and plasma displays, can be widely applied.

Furthermore, in the embodiment described above, the memory controller 46, the IEEE1394 interface 47, the IEEE1394 serial bus 48, the IEEE1394 interface 50, the read/write control unit 51 and the slot 43 compose a read/write means for storing in the external memory 42 DV video data D12, D20 and DV audio data D13, D21 being temporarily stored in the SDRAMs 41A to 41H and for reading these data when necessary. This invention, however, is not limited to this and another construction can be widely applied.

Furthermore, in the embodiment described above, the first external operation for writing in the external memory 42 DV video data D12, D20 and DV audio data D13, D21 temporarily stored in the SDRAMs 41A to 41H of the time shift module unit 40 is the pressing of the "pause" button of the remote controller 2, and the second external operation for reading the DV video data D12, D20 and DV audio data D13, D21 from the external memory 42 is the pressing of the "fast forward" button, etc. of the remote controller 2. This invention, however, is not limited to this and other operations can be applied as these first and second external operations.

Furthermore, in the embodiment described above, the control unit 4 for controlling the entire operation of the television receiver 1 is applied as a display control means for displaying on the display 15 video based on the DV video data D12, D20 read from the external memory 42. This invention, however, is not limited to this and a circuit block having such a function can be provided separately from the control unit 4.

Furthermore, in the embodiment described above, video of a user-watched channel and video based on DV video data D12, D20 read from the external memory 42 are displayed on the PinP screen 30 described above with reference to FIGS. 2A to 2C. This invention, however, is not limited to this and screens for these videos can be displayed in a picture and picture (P&P) manner, i.e., side by side, not by overlapping. In short, other display methods can be widely applied as a method for displaying the screens.

Furthermore, in the embodiment described above, the trick play for video being replayed by the television receiver 1 includes "fast forward" playback, "fast reverse" playback, "frame forward" playback, "frame reverse" playback, "slow playback forward", and "slow playback reverse". This invention, however, is not limited to this and other trick plays can be performed, such as "double-speed playback forward" and "double-speed playback reverse".

As described above, according to this invention, a video display apparatus includes a storage means for sequentially updating and temporarily storing video data of video being displayed on a display means; a read/write means for writing in a prescribed external storage medium the video data stored in the storage means according to a prescribed first external operation and for reading the video data from the external storage medium according to a prescribed second external operation; and a display control means for displaying on the display means video based on the video data read from the external storage medium by the read/write means. Therefore, video data of user-desired scenes selected from the video being displayed on the display means can be stored in the external storage medium and further the stored video data can be removed from the video display apparatus, thus making it possible to realize a video display apparatus capable of offering significantly improved functionality.

Further, according to this invention, a video display method includes sequentially updating and temporarily storing video data of video being displayed on a display means; writing in a prescribed external storage medium the stored video data according to a prescribed first external operation; reading the video data from the external storage medium according to a prescribed second external operation; and displaying on the display means video based on the video data read from the external storage medium. Therefore, video data of user-desired scenes selected from video being displayed on the display means can be stored in the external storage medium and further the stored video data can be removed from of the video display apparatus, thus making it possible to realize a video display method capable of significantly improving the functionality of a video display apparatus.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A video display apparatus, comprising:
a display unit operable to display video;
a storage unit operable to sequentially update and temporarily store video data of the video being displayed on the display unit;
a read/write unit operable to write the video data stored in the storage unit into an external storage medium according to a first external operation, read the video data from the external storage medium according to a second external operation, and sequentially update the video data stored in the storage unit;
a display control unit operable to display video on a screen of the display unit based on video data read from an external storage medium by the read/write unit;
wherein, when said first external operation is performed, the read/write unit transfers all the video data temporarily stored in the storage unit to the external storage medium, prohibits sequential updating of the storage unit until all the video data has been transferred to the external storage medium, resumes sequential updating after all the video data has been transferred even though the first external operation is still being performed, and reads the video data from the external storage medium according to the second external operation;

wherein the read/write unit is operable to compress the video data with a prescribed compression format and to store the compressed video data in the storage unit; and wherein the display control unit is operable to display one frame of the video data being displayed at a time the first external operation is performed, the one frame being displayed on at least a part of the screen of the display unit.

2. The video display apparatus according to claim 1, wherein the external storage medium is of a type that may be rewritten with data a fewer number of times than the storage unit.

3. The video display apparatus according to claim 1, wherein the external storage medium is a detachable external memory and information read out from the external memory other than the video data is displayed on the screen of the display unit.

4. The video display apparatus according to claim 3, wherein the information read out from the external memory includes information selected from the group consisting of information corresponding to a free storage capacity of the external memory and information corresponding to a read-out position of the video data to be read from the external memory according to the second external operation.

5. The video display apparatus according to claim 1, wherein the read/write unit is operable to prohibit a further performance of the first external operation while writing the video data stored in the storage unit into the external storage medium according to the first external operation.

6. The video display apparatus according to claim 5, wherein the read/write unit is operable to permit a further performance of the first external operation when the writing of the video data stored in the storage unit into the external storage medium has been completed.

7. The video display apparatus according to claim 1, wherein the read/write unit is operable to send the video data stored in the storage unit to the external storage medium using a communication method based on a prescribed copyright protection technique.

8. The video display apparatus according to claim 1, wherein the read/write unit is operable to write the video data stored in the storage unit into the external storage medium in a format based on a prescribed copyright protection technique.

9. The video display apparatus according to claim 1, wherein the read/write unit is operable to read the video data from the external storage medium using a readout mode specified by the second external operation.

10. The video display apparatus according to claim 9, wherein the display control unit is operable to display the video data read from the external storage medium in a display mode corresponding to the readout mode, the video data being displayed on at least a part of the screen of the display unit.

11. The video display apparatus according to claim 1, wherein the display control unit is operable to display on the display unit a first video based on the video data to be stored in the external storage medium and a second video based on the video data read from the external storage medium.

12. A video display method, comprising:

compressing with a prescribed compression format and temporarily storing video data of video being displayed on a display unit;

sequentially updating the temporarily stored video data;

displaying video on the display unit based on video data read from an external storage medium;

wherein, when a first external operation is performed, all of the temporarily stored video data is transferred to the external storage medium, the sequential updating is stopped until all the video data has been transferred to the external storage medium, the sequential updating resumes after all the video data has been transferred even though the first external operation is still being performed, and the video data is read from the external storage medium according to a second external operation; and wherein the display unit is operable to display one frame of the video data being displayed at a time the first external operation is performed, the one frame being displayed on at least a part of the screen of the display unit.

13. The video display method according to claim 12, further comprising compressing the video data in a prescribed compression format prior to the step of temporarily storing the video data.

14. The video display method according to claim 12, wherein the writing step includes sending the stored video data to the external storage medium using a communication method based on a prescribed copyright protection technique.

15. The video display method according to claim 12, wherein the writing step includes writing the stored video data into the external storage medium in a format based on a prescribed copyright protection technique.

16. The video display method according to claim 12, wherein the reading step includes reading the video data written in the external storage medium using a readout mode specified by the second external operation.

17. The video display method according to claim 12, wherein the display step includes displaying on the display unit a first video based on the video data to be stored in the external storage medium and a second video based on the video data read from the external storage medium.

* * * * *